United States Patent [19]

Salazar

[11] Patent Number: 5,367,236
[45] Date of Patent: Nov. 22, 1994

[54] DC MOTOR STALL-DETECTION SYSTEM

[75] Inventor: Edilberto I. Salazar, Brookfield, Conn.

[73] Assignee: Pitney Bowes Inc., Stamford, Conn.

[21] Appl. No.: 218,042

[22] Filed: Mar. 25, 1994

Related U.S. Application Data

[63] Continuation of Ser. No. 947,604, Sep. 21, 1992, abandoned.

[51] Int. Cl.⁵ .................. G05B 19/00; H02H 7/085
[52] U.S. Cl. ................................ 318/567; 318/434; 388/903; 388/907.5
[58] Field of Search ............... 318/567, 618, 626, 671, 318/672, 685, 434; 361/23; 388/903, 907.5, 912, 916, 930

[56] References Cited

U.S. PATENT DOCUMENTS

| | | | |
|---|---|---|---|
| 4,467,260 | 8/1984 | Mallick, Jr. et al. | 318/800 |
| 4,496,890 | 1/1985 | Wurdack et al. | 318/600 |
| 4,623,826 | 11/1986 | Benjamin et al. | 318/254 |
| 4,659,976 | 4/1987 | Johanson | 318/332 |
| 4,725,765 | 2/1988 | Miller | 318/434 |
| 4,821,203 | 4/1989 | Carlton et al. | 364/478 |
| 4,829,222 | 5/1989 | Hallenbeck et al. | 318/696 |
| 4,875,000 | 10/1989 | Fry et al. | 318/798 |
| 4,942,347 | 7/1990 | Ohtani et al. | 318/434 |
| 4,947,091 | 8/1990 | Fukuoka | 318/434 |
| 4,980,624 | 12/1990 | Bernhardt | 318/434 |
| 4,982,143 | 1/1991 | Gerschner et al. | 318/471 |
| 4,983,897 | 1/1991 | Tennant | 318/287 |
| 4,985,666 | 1/1991 | Nakabayashi | 318/434 |
| 4,999,552 | 3/1991 | Seipelt | 318/434 |
| 5,012,168 | 4/1991 | Dara et al. | 318/434 |
| 5,017,846 | 5/1991 | Young et al. | 317/244 |
| 5,028,854 | 7/1991 | Moline | 318/434 |
| 5,081,593 | 1/1992 | Pollack | 318/568.24 |

*Primary Examiner*—Bentsu Ro
*Attorney, Agent, or Firm*—Charles G. Parks, Jr.; Melvin J. Scolnick

[57] ABSTRACT

A motor controller is programmed for detecting motor-stall condition of a dc motor under the control of a motor control system. The motor control system includes a programmable microcontroller in connection with the motor controller and a motor driver. The motor driver communicates with a dc motor. The dc motor is coupled to a position encoder which encoder is in communication with the microcontroller. The method comprises the steps of providing an average stall threshold value ASV and providing the motor controller with a time counter for counting each time interval T to a maximum count N. The motor controller is programmed to issue a motor command representing the position error between the desired motor position and the actual motor position for some time interval T. During each time interval T, the motor command is compared to the average threshold value ASV, if the motor command is greater than the ASV then the count in the time counter is compared with the maximum count N. If the count is equal to the maximum count N then the controller signals the microcontroller a "motor stall" fault. If not, the motor is "OK" and the method is repeated for the next time interval T.

2 Claims, 2 Drawing Sheets

DC MOTOR STALL-DETECTION SYSTEM

This application is a continuation of application Ser. No. 07/947,604, filed on Sep. 21, 1992, now abandoned.

BACKGROUND OF THE INVENTION

The present invention relates to a DC motor servo system utilizing an application specific integrated circuit (ASIC) under the influence of a microcomputer for controlling a DC motor.

In many systems a DC motor is employed as a prime mover. One such system is a novel mail processing system. The mail processing system employs a plurality of system modules for processing envelopes. Particularly, the mail processing system includes a feeder section having a envelope stack receiving module, a singulation module, and an envelope flap moistening module. The feeder section is followed by a mailing machine section having an integral scale module, tape module, meter module and transport module.. A more detailed description of the mail processing system is presented in U.S. Pat. No. 4,935,078, entitled "High Through-Put Mail Processing System".

The mail processing system of particular interest offers the advantage of providing a minimum foot print and high through-put rate. In order to achieve this advantage, realizing that the mail processing system must accommodate a variety of different sized envelopes, it is necessary for the microcomputer system to exercise exacting servo control over the motors associated with one or more of the modules. In order to achieve the high through-put rate in light of the minimum feed path (foot print), a system constraint is to accommodate maximum acceleration and deceleration of a respective motor under system loads without destructively over-driving the motor.

It has been considered advantageous to provide the mail processing system with not only a minimum feed path but also minimum overall profile. In order to obtain this advantage along with the accompanying cost advantage, motors have been selected which provide the necessary transport torque, as a result, the smallest motor which provides sufficient transport torque has been chosen. In order to achieve the necessary accelerations, the motor must be overdriven for a short period. It has been empirically determined that the motors can survive the accelerator phase provided the motor is closely servo-ed by the motor controller. However, a particularly destructive condition occurs during an envelope jam. An envelope jam can cause a motor stall condition. This condition can be destructive to the motor as the motor controller is causing the motor to be overdriven, i.e., the motor controller is causing the motor driver to deliver excessive current or voltage to the motor for a prolonged time due to the stall condition.

SUMMARY OF THE INVENTION

It is an objective of the present invention to present a method of detecting a motor stall condition prior to motor destruction.

It is another objective of the present invention to present a dc motor under digital servo control such that when a motor stall condition is detected the microcontroller shuts down the system prior to motor stall.

It is a still further objective of the present invention to present a method of detecting a motor stall condition in a mail processing system wherein the stall condition is presented by an envelope jam, and upon detection, the mail processing system microcontroller shuts down the system for removal of the envelope jam.

In the preferred embodiment, a microcontroller is in bus communication with a Motor Control System Application Specific Integrated Circuit (MCS ASIC). The MCS ASIC is under the direction of the motor controller for servo-controlling a plurality of motors. In the most preferred embodiment, the MCS ASIC servo-controls each motor providing individually servo-controlled motors, the controller algorithm for each motor can be independently changed on the fly and the servo-rate for each motor is independently selectable. Further, each motor is subject to the control of a stall-detection algorithm. In response to the stall-detection algorithm, the motor controller will shut down the necessary module system motor to prevent motor destruction.

The MCS ASIC is a digital component designed to provide high-performance servo-control for dc motors. It operates as a peripheral device under the control of a host microprocessor which, in the preferred environment, is a mailing system controller. The motor controller performs digital filtering for closed-loop compensation. The respective input channels of the MCS ASIC transforms the signals from a respective motor position encoder into a digital word through a quadrature decoder and up/down counter, and the respective output channels transforms the filter digital output into a pulse-width modulated (PWM) signal. An output from the up/down is directed to the microcontroller where a position error of zero results in a motor command of zero, while a large sampled position error results to a large motor command magnitude. The position error is the difference between the .desired angular position and the sampled actual motor shaft position as provided by and incremental position encoder. Therefore, a stall condition exists when the motor's actual angular position lags the desired position excessively as the motion profile generator algorithm incrementally computes the next sampling interval's position command.

DETAILED DESCRIPTION OF THE PREFERRED EMBODIMENT

Figure 1:
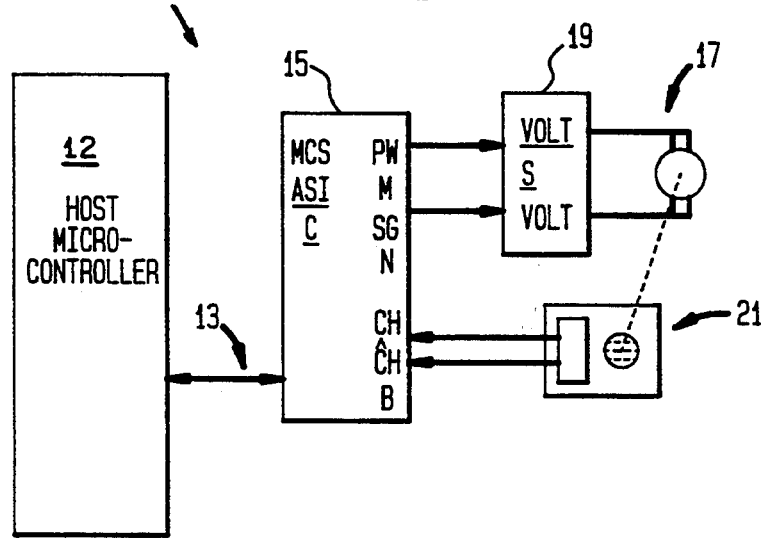
FIG. 1 is a diagram of the host motor controller, MCS ASIC and motor driver in accordance with the present invention.
Figure 2:
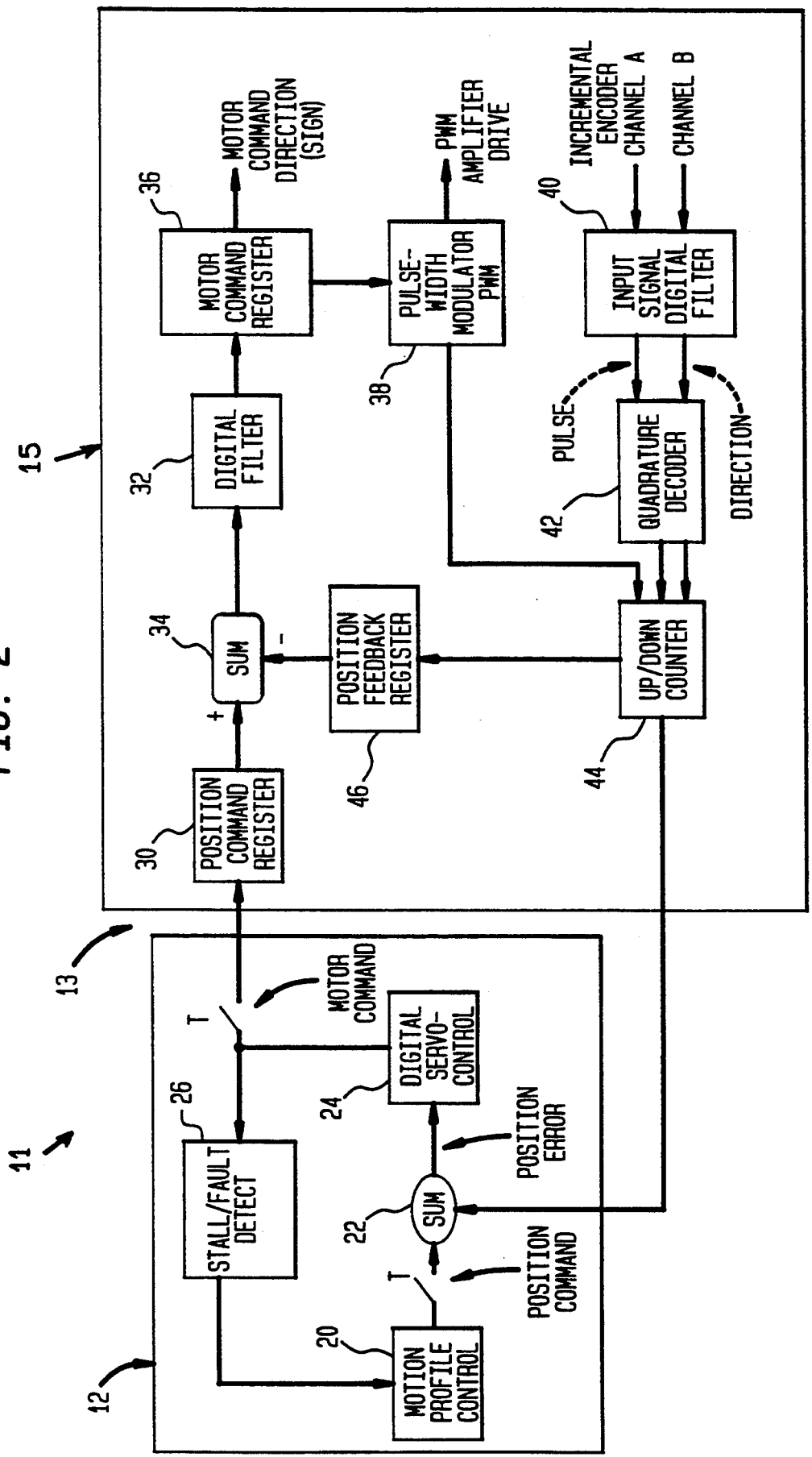
FIG. 2 is a schematic of a motor control system in accordance with the present invention.

Referring to FIGS. 1 and 2, the motor .control system, generally indicated a 11, is comprised of a microcontroller 12 which is bus 13 communication with a MCS ASIC 15. In the most preferred embodiment of the present invention, the MCS ASIC 15 controls eight separate motors 17 through a respective conventional amplifier 19. Each motor 17 is in communication with and encoder 21 in any suitable manner. The encoder 21 output is directed to the MCS ASIC 15.

Referring particularly to FIG. 2, the host microcontroller 12 is programmed within a motion profile control module 20 to generate a motion profile for the motor 17 divisible in T-intervals. The output motor position command of the motion profile control module 20 is directed to a digital servo-control 24 through a sum junction 22. The output of the sum junction 22 is representative of the motor position error between the desired position and the actual position of the motor 17. The position error output of the sum junction 22 is directed to a digital servo-control 24 which issues the motor command. The motor command output from the digital servo-control 24 is directed to a stall/fault detection module 26 of the microcontroller 12 and to the MCS ASIC 15 position command register 30 over bus 13 every T-interval.

The MCS ASIC 15 includes the position command register 30 who's output is directed to a digital filter 32 through a sum junction 34. The output of the digital filter 32 is directed to a motor command register 36. The motor command register 36 outputs a motor command direction signal to the amplifier 19. A pulse width modulator 38 obtains information from the motor command register from which the pulse width modulator 38 issues PWM signals to the amplifier 19. The MCS ASIC 15 also includes an input signal digital filter 40 which receives the output signals from the position encoder 21. The output of the input signal digital filter 40 is directed to a quadrature decoder 42. The output of the quadrature decoder 42 is directed to an up/down-counter 44. The output of the up/down counter 44 is directed to a position feedback register 46 which directs an output signal to the sum junction 34.

Generally the motor command signals from the microcontroller 12 are received in the position command register 30 which signals are compared to the signals from the position feedback register 46. As a result, the output from the sum junction 34 is representative of the position difference. That difference is received by the digital filter 32 which generates a new position command which is stored in the motor command register 36. The output from the encoder 21 is translated to a digital position word by the input signal digital filter 40, the quadrature decoder 42, and the up/down counter 44. The output of the up/down counter 44 is directed to the sum junction 22 of the microcontroller 12 to determine the position error as noted above. It should be appreciated by one skilled in the art that the MCS ASIC is a programmed device having a programmed microprocessing system specifically programmed with a particular control algorithm for each of a plurality of motors 19. In the preferred embodiment, the respective motor control algorithms are executed in the digital filter 32. Further, in the most preferred embodiment, the motor algorithm includes parameters stored in a parameter register (not shown) on the MIC ASIC which can be accessed by the microcontroller 12 such that the motor control algorithm can be changed on the fly. A detailed description of the preferred MCS ASIC 15 is presented in U.S. Pat. No. 4,931,712, entitled "Multiple Channel Servo Configuration", herein incorporated by reference.

Figure 3:
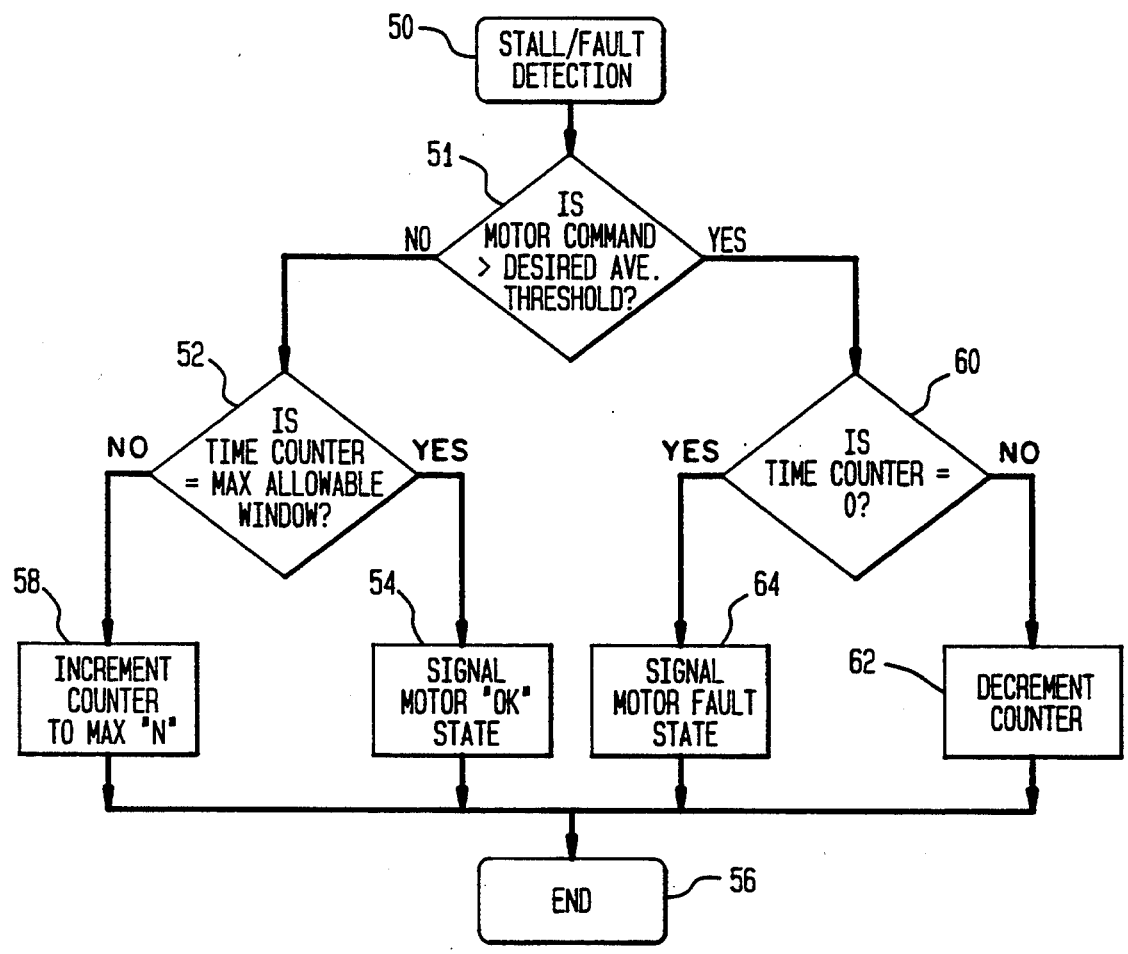
FIG. 3 is a logic flow representation of the stall logic of the microcontroller.

Referring to FIGS. 2 and 3, in order to detect an imminent motor stall, the stall/detection program module 26 is programmed to enter a routine at 50 each T-interval. At decision block 51, the motor command which is based on the determined position error is compared to a desired average threshold amount. The average threshold amount represents a time dependent average of the position error which is less than the motor destruction amount for the particular motor 17 as prescribed by the motor manufacturer.

If the motor command is less than the average threshold amount, at decision block 52, a programmed time counter is compared to a programmed maximum count. Again the maximum count is a prescribed parameter by the motor manufacturer. If the time count is equal to the maximum count, the motor is determined "OK" at logic block 54 and the routine is ended for that T-interval at block 56. At decision block 52, if the time count is not equal to the maximum count then the program count is incremented to a maximum count "N" at logic block 58 and the routine is ended at logic block 56 for that T-interval. It is noted that N multiplied T equals maximum time before motor destruction in micro seconds.

If at logic block 51, the motor command is greater than the average threshold, the time count tested at decision block 60 to see if the count is equal to zero. If the time counter is non-zero, then counter is decremented at logic block 62 and the routine is ended at 56. If at logic block 60 the counter has been decremented to zero, a motor stall state is declared at logic block 64 and the routine is ended at 56. Once a motor stall is declared the microcontroller has the option of taking appropriate corrective action. In the preferred application, that corrective action is stopping operation of a motor control system of a mail processing system.

The above description invention has been described in the preferred embodiment and system environment and should not be viewed a limiting. The full scope of the present invention is defined by the scope of the appendix claims.

What is claimed is:

1. A method of detecting a motor stall condition of a dc motor under the control of a motor control system having a programmable microcontroller in connection with a motor controller and a motor driver, said motor driver drives a dc motor, said dc motor being coupled to a position encoder which encoder is in communication with said microcontroller, wherein the method comprises the steps of:
    providing an average stall threshold value ASV;
    providing said motor controller with a time counter for keeping a count of each time interval T, to a maximum count N;
    programming said motor controller to issue a motor command representing the position error between a desired motor position and an actual motor position for said time interval T;
    programming said motor controller to perform the following steps for each of said time interval T:
        (a) comparing said motor command to said ASV, if said motor command is greater than said ASV then proceed to step (b), if said motor command is less than said ASV then proceed to step (c);
        (b) comparing said count in said time counter to said N, if said count is equal to said N then signal said microcontroller a "motor stall" fault, if said count is less than said N then proceed to step (c);
        (c) signaling said microcontroller a motor "OK"; and
        (d) repeating steps (a) through (c) for next time interval T.

2. A method of detecting a motor stall condition of a dc motor under the control of a motor control system having a programmable microcontroller in connection with a motor controller and a motor driver, said motor driver communicates with a dc motor, said dc motor being coupled to a position encoder which encoder is in communication with said microcontroller, said method comprising the following programmable steps for each time interval T:

(a) comparing a motor command to an average stall threshold value ASV, if said motor command is greater than said ASV then proceed to step (b), if said motor command is less than said ASV then proceed to step (d);

(b) comparing a count in a time counter in said motor controller to zero, if said count is equal to zero then signal a motor "stall fault" if said count is non-zero then proceed to step (c);

(c) decrementing said count in said time counter and then proceed to step (e);

(d) if said count in said time counter equals N, wherein N is a predetermined maximum value, then signal a motor "OK" and proceed to step (e), if said count is not equal to said N then increment said count up to said N and proceed to step (e); and (e) repeat steps (a) through (e) for next time interval T.

* * * * *